US010551609B2

(12) United States Patent
Ripoll Lorenzo et al.

(10) Patent No.: US 10,551,609 B2
(45) Date of Patent: Feb. 4, 2020

(54) MICROSCOPE AND METHOD FOR GENERATING 3D IMAGES OF A COLLECTION OF SAMPLES

(71) Applicant: Universidad Carlos III de Madrid, Leganes, Madrid (ES)

(72) Inventors: Jorge Ripoll Lorenzo, Madrid (ES); Alicia Arranz de Miguel, Madrid (ES)

(73) Assignee: UNIVERSIDAD CARLOS III DE MADRID, Leganes, Madrid (ES)

( * ) Notice: Subject to any disclaimer, the term of this patent is extended or adjusted under 35 U.S.C. 154(b) by 163 days.

(21) Appl. No.: 15/521,220

(22) PCT Filed: Jun. 10, 2015

(86) PCT No.: PCT/ES2015/070455
§ 371 (c)(1),
(2) Date: Apr. 21, 2017

(87) PCT Pub. No.: WO2016/062907
PCT Pub. Date: Apr. 28, 2016

(65) Prior Publication Data
US 2017/0351082 A1 Dec. 7, 2017

(30) Foreign Application Priority Data

Oct. 21, 2014 (ES) .................................. 201431546

(51) Int. Cl.
*G02B 21/36* (2006.01)
*G06T 15/08* (2011.01)
(Continued)

(52) U.S. Cl.
CPC .......... *G02B 21/367* (2013.01); *G02B 21/06* (2013.01); *G02B 21/16* (2013.01); *G02B 21/26* (2013.01);
(Continued)

(58) Field of Classification Search
CPC ...... G02B 21/06; G02B 21/16; G02B 21/367; G06T 15/00; G06T 15/08
See application file for complete search history.

(56) References Cited

U.S. PATENT DOCUMENTS 6,160,908 A    12/2000 Hakozaki
7,554,725 B2    6/2009 Stelzer et al.
(Continued)

FOREIGN PATENT DOCUMENTS

WO    2013176549 A1    11/2013
WO    2016062907 A1    4/2016

OTHER PUBLICATIONS

Mayer et al., "OPTiSPIM: integrating optical projection tomography in light sheet microscopy extends specimen characterization to nonfluorescent contrasts", Optics Letters, Optical Society of America, Feb. 15, 2014, vol. 39, Issue No. 4, pp. 1053-1056, 4 pages.
(Continued)

*Primary Examiner* — Mainul Hasan
(74) *Attorney, Agent, or Firm* — Hayes Soloway PC

(57) ABSTRACT

The invention relates to a microscope and a method for producing 3D images of various transparent or semi-transparent samples, fundamentally comprising: causing a relative movement according to the detection direction between the sheet of light and the sample while maintaining a constant angle of acquisition; producing, for said angle of acquisition, a single 2D projection image formed by a representative parameter for each pixel; modifying the angle of acquisition by means of a relative rotation between the sheet of light and the sample, combined with a relative vertical translation between the sheet of light and the sample, and repeating the previous steps; and generating a 3D image of each of the samples from the set of 2D projection images that are produced.

10 Claims, 5 Drawing Sheets

(51) Int. Cl.
*H04N 13/02* (2006.01)
*G02B 21/06* (2006.01)
*G02B 21/26* (2006.01)
*G06T 11/00* (2006.01)
*G06T 15/00* (2011.01)
*G02B 21/16* (2006.01)

(52) U.S. Cl.
CPC ............ *G06T 11/006* (2013.01); *G06T 15/00* (2013.01); *G06T 15/08* (2013.01); *G06T 2207/10056* (2013.01); *G06T 2207/10101* (2013.01); *G06T 2207/20048* (2013.01)

(56) References Cited

U.S. PATENT DOCUMENTS

| | | | |
|---|---|---|---|
| 2007/0258122 A1* | 11/2007 | Chamgoulov | G02B 21/0036 702/1 |
| 2009/0091566 A1 | 4/2009 | Turney et al. | |
| 2009/0213214 A1 | 8/2009 | Yamada | |
| 2011/0115895 A1 | 5/2011 | Huisken | |
| 2013/0200255 A1 | 8/2013 | Schwarzband et al. | |
| 2014/0362436 A1* | 12/2014 | Forget | G01N 35/00029 359/391 |
| 2015/0098126 A1* | 4/2015 | Keller | G02B 21/0076 359/385 |

OTHER PUBLICATIONS

Huisken et al., "Optical Sectioning Deep Inside Live Embryos by Selective Plane Illumination Microscopy", Science Magazine, www.sciencemag.org, vol. 305, Aug. 13, 2004, 18 pages.

Psycharakis et al., "Optical Projection Tomography and Light Sheet Microscopy for imaging in biological specimens a comparison study", IEEE, 2014 IEEE International Conference on Imaging Systems and Techniques (IST) Proceedings, 5 pages.

Sharpe et al., Optical Projection Tomography as a Tool for 3D Microscopy and Gene Expression Studies, Science, Apr. 19, 2002, pp. 541-545, vol. 296, Issue 5567, DOI: 10.1126/science.1068206.

Siedentopf et al., Ultramicroscopy, Annalen der Physik 10(1), 1903.

Fuchs et al., Thin laser light sheet microscope for microbial oceanography, Optics Express, Jan. 28, 2002, pp. 145-154, vol. 10, Issue 2, doi.org/10.1364/OE.10.000145.

Voie et al., Orthogonal-plane fluorescence optical sectioning: three-dimensional imaging of macroscopic biological specimens, Journal of Microscopy, Jun. 1993, pp. 229-236, vol. 170, doi:10.1111/j.1365-2818.1993.tb03346.x.

Preibisch et al., Software for bead-based registration of selective plane illumination microscopy data, Nature Methods, Jun. 1, 2010, pp. 418-419, vol. 7, Issue 6, doi:10.1038/nmeth0610-418.

* cited by examiner

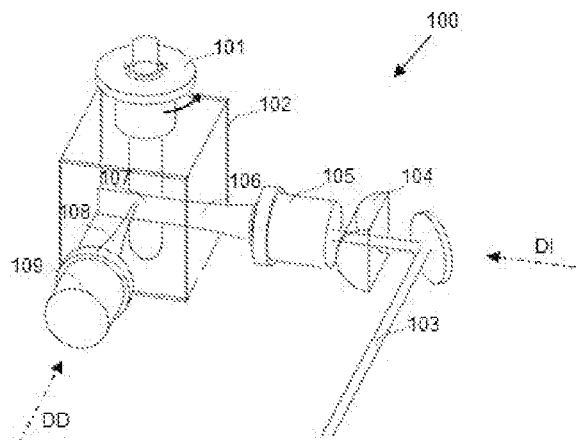
FIG. 1a - Prior Art
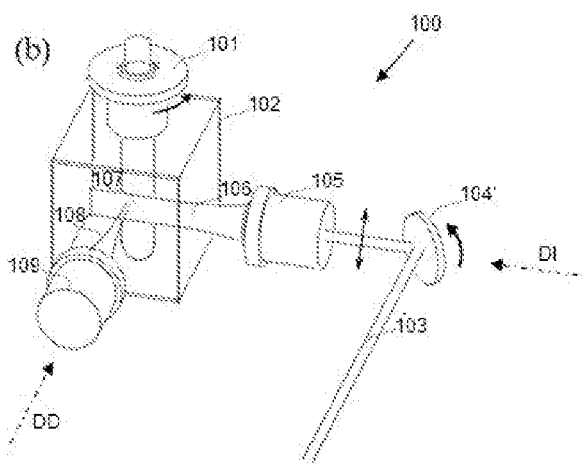
FIG. 1b - Prior Art
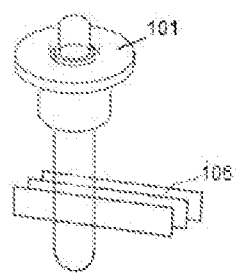
FIG. 2 - Prior Art Projection of the sum for each angle

| | | | | | |
|---|---|---|---|---|---|
| 0° | 0 | 1 | | 1 | 0 |
| 90° | 0 | | | 1 | 0 |
| 180° | 0 | 1 | | 1 | 0 |
| 270° | 0 | | | 1 | 0 |

FIG. 5d

MICROSCOPE AND METHOD FOR GENERATING 3D IMAGES OF A COLLECTION OF SAMPLES

OBJECT OF THE INVENTION

The present invention is comprised in the field of plane beam illumination techniques used in optical microscopes for producing images of various transparent or semi-transparent samples such as embryos, tissues and other biological samples, as well as other materials.

A first object of the present invention is a new method capable of producing 3D images of transparent or semi-transparent samples with a quality that exceeds that of optical microscopes today.

A second object of the present invention is a microscope that is particularly designed for carrying out the preceding method.

BACKGROUND OF THE INVENTION

Unlike what occurs with individual cells, the study of embryos and similar biological samples through an optical microscope presents particular problems relating to light absorption and resolution loss due to light scattering. To solve these problems, considerable improvements to plane laser beam microscopes, invented in 1903, have been developed in recent years. See for example the document titled "Ultramicroscopy" by Siedentopf and Zsigmondy (Analen der Physik 10(1), 1903). After some minor improvements proposed by Voie et al., in J. Micros. 170, 1993 (technique referred to as OPFOS by the authors), or by Fuchs et al. in Opt. Exp. 2002 referred to as "Thin-sheet imaging microscopy" or TSLIM, in 2004 Stelzer's group presented a plane laser beam microscope referred to as SPIM (Selective Plane Illumination Microscope), having applications in both the image in vivo and in fixed tissue and transparent or semi-transparent samples in general.

A plane laser beam microscope is fundamentally formed by a camera coupled to a objective having a high numerical aperture and arranged according to a direction referred to as "detection direction," and a lighting means capable of emitting a thin sheet of light according to a direction referred to as "illumination direction" which is perpendicular to the detection direction, following the original configuration by Siedentopf and Zsigmondy coupled to a detection camera. With this configuration, the camera can produce a 2D fluorescence image of the part of the sample illuminated by the sheet or plane of light. If the sample is further moved in the direction of the axis of detection and several 2D images are taken at different positions, a set or stack of 2D images is generated where each of the 2D images corresponds to a position of the plane of light with respect to the sample. This stack of 2D images contains information about the position in z (depth of the sample according to the detection direction) produced by moving the sample, and about positions x and y, present in each 2D image. The stack of 2D images can then be fused together for generating a 3D image of the sample, as described in patent document U.S. Pat. No. 7,554,725 by Stelzer et al.

A drawback of the plane laser beam microscopy technique is that it has worse resolution on the axis of detection than on the plane of the image. In other words, resolution along the x and y axes in the 3D image is more precise than the resolution along the z axis. The multi-view SPIM or mSPIM technique has been developed to solve this anisotropy (see document US 2011/115895 by Huisken). This technique fundamentally consists of including an additional illumination arm for producing at least two illumination measurements opposite one another by 180°. Image resolution can be enhanced by means of a slight pivoting of less than 10° of the light plane on the plane of illumination. If an additional camera is also included, four simultaneous measurements corresponding to all the possible combinations between camera/illumination arm can be taken. These 2D images are later fused together for generating a single higher quality 3D image of the sample in question.

Another one of the proposed ways to enhance image anisotropy and quality is to combine several angular measurements in a single 3D measurement. In other words, the sample is rotated about its own axis, usually a vertical axis, such that several stacks of 2D images are captured (commonly referred to as "angular measurements"), each of which corresponds to a different angle of rotation of the sample. This was the proposal published by S. Preibisch et al., Nature Methods 7 (2010), who propose the use of reference fiducials in order to suitably align these angular measurements.

To better understand this technique, FIGS. 1a and 1b are enclosed, showing two examples of plane laser beam microscopes (100). In FIG. 1a, the sample (107) is arranged on a support (101) in a bath (102). A Gaussian, Bessel or Airy linear light beam (103) strikes a cylindrical lens (104) that focuses it as a result of an illumination objective (105) for generating the vertical plane light sheet (106). This vertical plane light sheet (106) strikes the sample (107) according to the illumination direction (DI), and the fluorescent light (108) is picked up by a detection objective (109) oriented according to the detection direction (DD), which is perpendicular to the illumination direction (DI). FIG. 1b shows a similar microscope (100), although in this case the formation of the plane light sheet (106) takes place by means of the vertical scanning of the linear light beam (103) by means of a galvanometric mirror (104') or the like. In both cases, the support (101) can rotate about its vertical axis in order to allow taking several angular measurements according to the technique proposed by Preibisch.

FIG. 2 shows a detail of the formation of a stack of 2D images of the sample with a plane laser beam microscope (100) according to FIG. 1a or 1b. It can be seen how the sheet (106) moves according to the detection direction, one 2D image being taken for each of said positions. The final result is to produce a stack of 2D images. For carrying out the method proposed by Preibisch et al., this process is repeated several times for different angles of rotation of the sample about the vertical axis, which allows producing a 3D image of the sample with greater isotropy.

However, the introduction of these angular measurements entails increasing exposure time and the duration of the experiment in a manner that is proportional to the number of angular measurements. Indeed, given that the exact position exacta of the center of rotation is unknown, fusing all the angular images that are produced in a plane laser beam microscope requires the use of fiducials for generating the final 3D image (see S. Preibisch, et al., Nature Methods 7, 2010), which requires enormous computing power and storage capacity and complicates experimental measurement.

DESCRIPTION OF THE INVENTION

The present invention solves the preceding problem as a result of a new microscope and method of generating 3D images that requires much less computing power and storage capacity than current plane laser beam techniques do. This is advantageous not only with respect to the requirements for a microscope designed for carrying out this method, but it furthermore allows generating 3D images with higher resolution and less anisotropy. In the context of acquiring images of samples in vivo, the speed at which the images are produced is crucial, since this will determine if information can be produced that is useful for understanding certain biological processes. Furthermore, the new microscope and method allow producing images of various different samples vertically located one on top of another, which is not possible with the equipment available today.

In the interest of assuring the clarity of the description, a series of terms that will be used in this document is described below.

Illumination direction: Direction along which the sheet or plane of light going through the sample is projected.

Sheet of light: Thin sheet of light emitted towards the sample according to the illumination direction. The plane containing the sheet of light, referred to as plane of light, is usually vertical.

Detection direction: Direction according to which the objective of the camera for producing 2D images of the sample is arranged. It is perpendicular to the sheet of light, and is therefore usually horizontal. The objective of the camera can have a high or low magnification and a high or low numerical aperture.

2D image: Each of the individual images produced by the camera. Each of such images individual corresponds to a position of the sheet of light in relation to the sample.

Stack of 2D images: Set of 2D images produced by the camera and corresponding to parallel positions of the sheet of light as a result of either the movement of the sample according to the detection direction or else the movement of the sheet of light in the same direction.

3D image: Image generated from a set of stacks of 2D images corresponding to illuminating the sample from different orientations.

Projection image: 2D image that can be generated by illuminating the sample and producing, on the side of the sample opposite the side from which it has been illuminated, a projection image that may resemble the "shadow" that has been projected. It can also be produced from a stack of 2D images by applying a parameter to each pixel of the image, for example a statistical parameter such as the variance, maximum value, minimum value, mean value, correlation between pixels, etc.

Angle of acquisition: This is the angle of the horizontal plane between the detection direction and a vertical plane of the sample, for example the plane of symmetry or the like in the case of certain organisms. As mentioned, this angle remains constant during the acquisition of each stack of 2D images.

The inventors of the present invention have developed a new microscope and method for generating a 3D image which combines techniques commonly used in plane laser beam microscopy with the techniques that are normally used in OPT microscopy.

The OPT (Optical Projection Tomography) technique, which is described in patent document US20060122498 A1, is relatively similar to X-ray tomography. It is fundamentally based on optically illuminating the sample in a homogenous manner and producing, on the side of the sample opposite the side from where it is illuminated, an image which may resemble the "shadow" projected by the sample on a plane, or in the case of measuring fluorescence, the total emission of the illuminated volume. This "shadow" or fluorescence emission, usually referred to as projection image, has different shades of gray depending on the light absorption and/or fluorescence emission produced in different parts of the sample. If the sample is illuminated from several angles, it is possible to implement a reconstruction algorithm on all the images that are produced for generating a 3D image of said sample. This reconstruction algorithm is usually based on solving the Radon transform, originally developed for the 3D X-ray imaging.

Unlike plane laser beam microscopes, OPT (Optical Projection Tomography, Sharpe Science 2002) type microscopes illuminate the entire sample simultaneously and base their 3D reconstruction on angular measurements, similarly to X-ray computed tomography (CT scan) but with optical measurements of both absorption and fluorescence. A drawback of OPT microscopy is the need to use low numerical apertures in order to keep all or at least half of the sample within the focal plane, thereby reducing both the sensitivity and resolution of these apparatus. On the other hand, OPT measurements are easy to implement since each angular measurement consists of a single projection of the entire volume, being able to use existing algorithms, such as filtered backprojection, or even model the light scattering present in the sample and produce images of samples with a high scattering coefficient.

FIG. 3 schematically shows the operation of an OPT microscope (200). The assembly fundamentally consists of a detection objective (201) coupled to a camera and facing the sample (202) in order to pick up the fluorescence or transillumination (203) caused by the homogenous light emitted by an element that is not shown in the image. The sample (202), which is contained in a bath (204) fixed to a support (205), rotates about its own axis, usually a vertical axis, such that several images corresponding to different angles are taken. The inverse Radon transform is then implemented (using filtered backprojection, for example, or another reconstruction algorithm) to construct a single 3D image of the sample.

The microscope and method proposed by the authors of the present application combines characteristics of both techniques such that the resolution and quality of the final 3D image are enhanced by combining both types of equipment in a single piece of equipment. Like the plane laser beam technique the microscope and method of the invention use a sheet of light for producing clear information about the inside of the sample. This allows increasing the numerical aperture of the camera, since the distance between the objective and the plane of light is always known, thereby enhancing the resolution of the images that are produced. On the other hand, as occurs in the OPT technique, the microscope and method of the invention do not store a 2D image for each position of the sheet of light, but rather they only store for each angle of acquisition a representative parameter of each pixel. In other words, a single projection 2D image (similar to the OPT technique) is stored for each angle of acquisition, instead of an entire stack of 2D images (like in the plane laser beam technique). This allows not only reducing system requirements, but also increasing the rate of acquisition. Furthermore, by means of vertical translation and the use of a container in which various samples can be placed, this new invention allows producing images of various samples arranged one on top of another, as can be seen in FIG. 4.

Accordingly, the present invention describes a method for generating 3D images of a collection of samples by means of a microscope comprising an image acquisition means facing the collection of samples according to a detection direction, and a lighting means configured for emitting a plane sheet of light towards the collection of samples according to a direction perpendicular to the detection direction. As discussed above in this document, the collection of samples comprises various samples located one on top of another. The method comprises the following steps:

1) Causing a relative movement according to the detection direction between the sheet of light and the sample while maintaining a constant angle of acquisition.

As is known in the art, this relative movement can be done in two ways: by keeping the sheet of light immobile and moving the sample according to the detection direction, or by keeping the sample immobile and moving the sheet of light. In either case, the fact of the matter is that the sheet of light performs a "scan" of the sample along the detection direction.

2) Producing, for said angle of acquisition, a single 2D projection image formed by a representative parameter for each pixel.

According to a preferred embodiment of the invention, the representative parameter for each pixel is a statistical parameter, such as, for example, the maximum value, variance, minimum value, standard deviation, average value, correlation between pixels, etc. In this case, producing the statistical parameter can be carried out by acquiring images continuously for each angle of acquisition, i.e., by causing a continuous relative movement between the sheet of light and the sample according to the detection direction while at the same time acquiring images at a high speed (more than 100 images per second). Since the statistics of each pixel are of interest, exposure times can be extremely short, with noise signal values less than those used in a plane laser beam microscope.

According to another alternative embodiment of the invention, the representative parameter for each pixel is the sum of the intensities of each pixel. The sum of the intensities of each pixel can be produced by causing a continuous relative movement between the sheet of light and the sample according to the detection direction while at the same time the exposure of the image acquisition means is kept open. In other words, in the projection image that is produced each pixel has as a final value the sum of intensities which that pixel has received throughout the entire process of moving the sheet of light along the sample.

3) Modifying the angle of acquisition by means of a relative rotation between the sheet of light and the sample, combined with a relative vertical translation between the sheet of light and the sample, and repeating the previous steps.

Once the projection image for a given angle of acquisition has been produced and stored, the angle of acquisition is modified and the process is repeated, and so on for a configurable number of angles of acquisition, such that a set of 2D projection images is produced. This angular information would in fact correspond to an OPT measurement taken with an objective with a high numerical aperture, which measurement cannot be taken with the low numerical aperture requirements needed for OPT. Furthermore, since the complete volume of the sample is not illuminated simultaneously, the effects of photobleaching and phototoxicity.

As previously discussed, the fact that in this technique only one 2D projection image is produced and stored for each angle of acquisition differs from the multi-angular plane laser beam technique proposed by Preibisch (Nat. Meth. 2010) or with multiview SPIM proposed by Huisken, in which an entire stack of 2D images is stored for each angle of acquisition, since the storage and processing of all that information considerably slows up the process and calls for greater requirements in relation to the equipment required for carrying it out.

On the other hand, relative vertical translation between the sheet of light and the sample is added here to the step of modifying the angle of acquisition by means of using a long-stroke motor. In other words, what is known as a helical OPT (hOPT), which is equivalent to helical or spiral CT scan, is applied. As discussed, this can be done by either moving the sample vertically, or else by moving the sheet of light vertically together with the detection system. In any case, the combination of rotation with translation generates a helical movement that allows producing information about various samples arranged one on top of another or about a very long single sample, which is not possible with the current plane laser beam technique.

Additionally, a preferred embodiment of the invention further comprises modifying the position of the sample within a plane perpendicular to the axis of rotation of said sample in order to always center the same portion of the sample opposite the detection direction. In other words, the sample is centered again in the field of view of the microscope by means of a movement in the mentioned plane (which can also be defined as perpendicular to vertical translation, or plane containing the detection and illumination directions). This allows analyzing very large tissues or samples, which is not possible today.

4) Generating a 3D image of each of the samples from the set of projection images that are produced.

Finally, a reconstruction algorithm is implemented in the information about the set of projection images that are produced for generating a single 3D image of the sample. For example, the projection images can be introduced in a filtered backprojection algorithm or in a projection reconstruction algorithm, such as inverse Radon transform, generating the 3D image of the sample.

It should be pointed out that a conventional plane laser beam microscope does not produce 3D images this way. In those cases, the 3D image is constructed from the stack of 2D images that is produced, or in the case of Preibisch's multi-angle SPIM or Huisken's mSPIM, the fusion of several stacks of 2D images corresponding to each angle. No invention generally relating to plane laser beams describes the use of the inverse Radon transform to generate a 3D image.

Additionally, according to another preferred embodiment of the invention, the method further comprises the step of combining several 3D images that are produced using different parameters for producing an enhanced final 3D image. For example, if the 3D image that is produced using the sum of intensities is subtracted from the 3D image that is produced using the maximum intensity as a parameter, contrast can be enhanced by eliminating the background. On the other hand, it is possible for the 3D image that is produced from the variance to provide additional information that does not have an image produced from the intensity, with more anatomical detail, for example.

A second aspect of the invention relates to a microscope that is particularly designed for carrying out the method described, comprising an image acquisition means facing the collection of samples according to a detection direction, and a lighting means configured for emitting a plane sheet of light towards the collection of samples according to a direction perpendicular to the detection direction, where the collection of samples comprises various samples located one on top of another. The microscope of the invention further comprises:

a) Means for causing a relative movement according to the detection direction between the sheet of light and the sample while maintaining a constant angle of acquisition.
b) Means for producing, for said angle of acquisition, a single 2D projection image formed by a representative parameter for each pixel.
c) Means for modifying the angle of acquisition by means of a relative rotation between the sheet of light and the sample, combined with a relative vertical translation between the sheet of light and the sample.
d) Means for generating a 3D image of each of the samples from the set of 2D projection images that are produced.

In a preferred embodiment of the invention, the means for causing a relative movement according to the detection direction between the sheet of light and the sample are configured for performing a continuous movement.

In another preferred embodiment of the invention, the means for performing a relative vertical translation between the sheet of light and the sample comprise an electric long-stroke motor.

BRIEF DESCRIPTION OF THE DRAWINGS

FIGS. 1a and 1b respectively show a schematic view of two examples of conventional plane laser beam type microscopy according to the prior art.

FIG. 2 shows a detail of the acquisition of a set of 2D images of the sample.

FIGS. 5(a), 5(b), 5(c) and 5(d) respectively show: FIG. 5(a) shows a number chart of a 2D image of an object; FIG. 5(b) shows examples of projections on the 2D image of FIG. 5(a) corresponding to different parameters for an angle of rotation of 0°; FIG. 5(c) shows examples of projections on the 2D image of FIG. 5(a) corresponding to different parameters for a angle of rotation of 90°; and FIG. 5(d) shows examples of projections on the 2D image of FIG. 5(a) corresponding to the parameter "Sum" for angles of rotation 0°, 90°, 180° and 270°.

PREFERRED EMBODIMENT OF THE INVENTION

FIGS. 5(a)-5(d) depict a simplified example showing the process of producing angular projection images of a two-dimensional object corresponding to different parameters. The parameters used in this example are the mean, minimum value, variance, sum and maximum value.

Figure 5A:
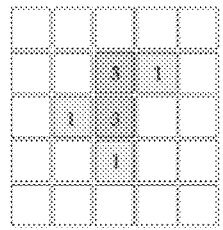

FIG. 5(a) shows the object with the values that are produced after the acquisition of five images corresponding to a given angle of acquisition which, due to the simplification of this example, would be one-dimensional. It could be said that it is a stack containing five 1D images (five rows) representing five sections of the object.

Figure 5B:
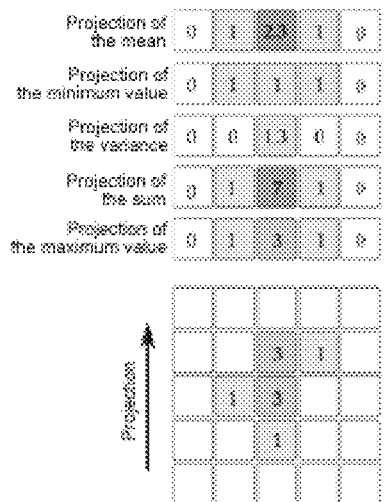

Several projection parameters can be generated from this data. FIG. 5(b) shows an example of producing several projection images from the stack of images corresponding to an angle of acquisition of 0°. It must be noted that in the present invention, it is not necessary to store all the images of the stack of images that is produced, since the calculation of the parameter can be done as the images are produced while "scanning" the object according to the detection direction.

Figure 5C:
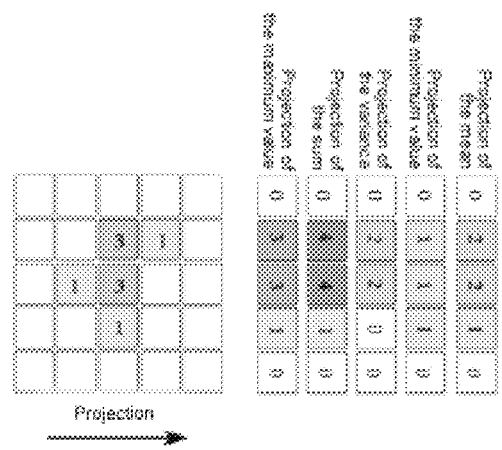

Once the corresponding projection image has been generated, the sample is rotated and a new stack of images from which another projection image will be produced is acquired. In the event of vertical movement, said vertical movement would usually take place after rotation. FIG. 5(c) shows an example corresponding to an angle of acquisition of 90° for the same parameters. For the sake of simplicity, the same stack of images as the one in FIG. 5(b) is used, although a stack of images that is different from the previous one would logically be produced in reality.

This process is repeated for a given number of angular measurements, in this specific example four measurements corresponding to 0°, 90°, 180° and 270°. The result is shown in FIG. 5(d), where the four projection images corresponding to the sum parameter are seen. These projection images are later introduced in a code solving the inverse Radon transform, for example, or in a more advanced tomographic projection code taking into account the presence of scattering, generating the final 3D image.

Figure 6:
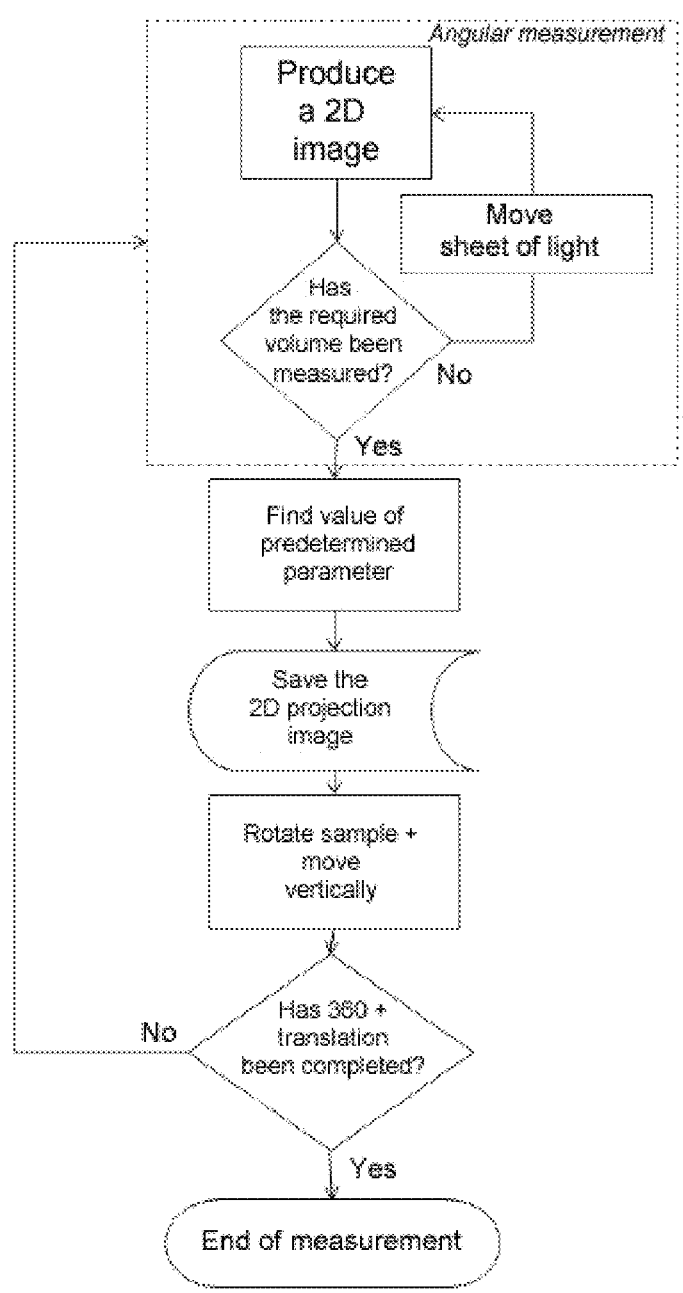
FIG. 6 shows a flow chart of the method that is carried out for producing the projection image for each angle.

The complete method is shown in the algorithm depicted in FIG. 6. First, a 2D image corresponding to a given angle of acquisition is taken. Then the sheet of light is moved and another 2D image is taken. This process is repeated as many times needed until images covering the entire required volume have been taken. Then the given parameter for each of the pixels of the 2D images that are produced is calculated, resulting in the projection image corresponding to that first angle of acquisition. The resulting 2D image projection is stored.

Then after imparting to the sample a rotation to a second angle of acquisition combined with a vertical movement, the previous operations are repeated. This entire process is repeated until a complete turn around the sample or samples has been completed. Finally, the set of projection images that has been stored is introduced in an algorithm for generating the final 3D image, for example, by using a filtered back-projection type algorithm or an inverse Radon transform algorithm.

A specific example of use of this method could consist of a sample of zebrafish embryo expressing a protein. This embryo can be introduced in a transparent container (an FEP tube, for example), or can be embedded in agarose such that it can be moved in the plane of measurement and can be rotated about an axis of rotation. Once this sample has been placed on the microscope of the invention, the light source would be switched on to create a plane light beam. Once the parameter to be saved has been chosen (maximum intensity of the stack of 2D images, for example), the plane of light would be moved with respect to the sample from an initial position to a final position, saving the 2D projection image containing statistical information about this movement. This process would be repeated for each angle of measurement up to a total of M angles, generating a stack M projection images. These projection images would be introduced in a filtered backprojection algorithm, for example, or in a predefined projection reconstruction algorithm, generating the 3D image of the sample.

Figure 3:
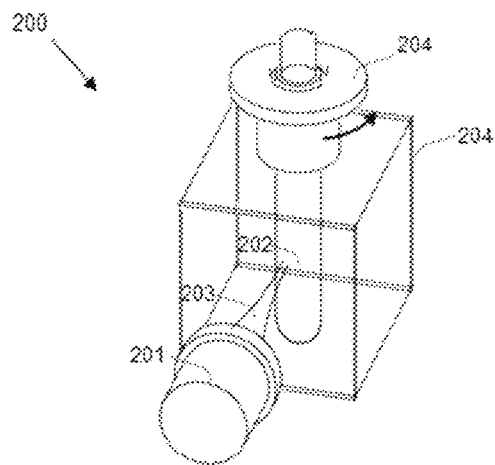
FIG. 3 shows a schematic view of a conventional OPT type microscope according to the prior art.
Figure 4:
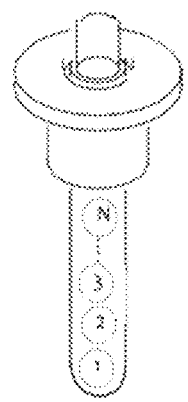
FIG. 4 shows a support designed for housing the collection of samples arranged one on top of another.

Another example could consist of N samples of tissue with fluorescent stain, previously clarified and fixed. These N samples can be introduced in a single transparent container or can be embedded in agarose such that they can be moved in both the plane of measurement and vertically, and the set of samples can be rotated about an axis of rotation. The result would be similar to that shown in FIG. 4. Once these samples have been placed on the microscope of the invention, the light source would be switched on to create a plane light beam. Once the parameter to be saved has been chosen (maximum intensity of the stack of 2D images, for example), the plane of light would be moved with respect to the sample from an initial position to a final position, saving the 2D projection image containing the statistical information about this movement. Once the scan performed by the plane of light has ended, rotation and, simultaneously, vertical translation of the sample would be performed. This process would be repeated until the entire sample has been scanned, which requires to that end performing several complete rotations with a total of M angles, generating a stack of M helical projection images. These projection images would be introduced in a filtered backprojection algorithm with helical movement, for example, or in a projection reconstruction algorithm with predefined vertical translation, generating the 3D image of all the samples simultaneously.

The invention claimed is:

1. A method for generating 3D images of a collection of samples by means of a microscope, characterized in that the microscope comprises an image acquisition device facing the collection of samples according to a detection direction, and a lighting device configured for emitting a plane sheet of light towards the collection of samples according to a direction perpendicular to the detection direction, where the collection of samples comprises various samples located one on top of another, the method comprising the following steps:
    causing a relative movement according to the detection direction between the sheet of light and the sample while maintaining a constant angle of acquisition;
    obtaining, for said angle of acquisition, a single 2D projection image formed by a representative parameter for each pixel, wherein the 2D projection image is produced by acquiring 2D images continuously for each angle of acquisition while causing a continuous relative movement between the sheet of light and the sample according to the detection direction and keeping a statistical parameter for each pixel of interest, wherein the statistical parameter is selected from the maximum value, variance, minimum value, standard deviation, average value and correlation between pixels;
    modifying the angle of acquisition by implementing a relative rotation between the sheet of light and the sample, making use of a rotational stage which allows rotation around an axis, combined with a relative vertical translation between the sheet of light and the sample, and repeating the previous steps; and
    generating a 3D image of each of the samples from the set of 2D projection images that are produced for each angle by using an inversion approach comprising applying an inverse Radon transform to the set of projection images that are produced to generate the 3D image;
    wherein the statistical parameter is produced by causing a continuous relative movement between the sheet of light and the sample according to the detection direction and acquiring images at a high speed.

2. The method according to claim 1, wherein the representative parameter for each pixel is the sum of the intensities of each pixel.

3. The method according to claim 2, wherein the sum of the intensities of each pixel is produced by causing a continuous relative movement between the sheet of light and the sample according to the detection direction while at the same time the exposure of the image acquisition means is kept open.

4. The method according to claim 1, wherein the step of modifying the angle of acquisition further comprises modifying the position of the sample within a plane perpendicular to the axis of rotation of said sample in order to always center the same portion of the sample opposite the detection direction.

5. The method according to claim 1, wherein the step of generating a 3D image of the sample comprises applying a filtered back-projection algorithm to the set of projection images that are produced.

6. The method according to claim 1, which further comprises combining several 3D images that are produced by using different representative parameters for producing an enhanced 3D image.

7. A microscope for generating 3D images of a collection of samples capable of Carrying out the method of claim 1, characterized in that it comprises an image acquisition means facing the collection of samples according to a detection direction, and a lighting means configured for emitting a plane sheet of light towards the collection of samples according to a direction perpendicular to the detection direction, wherein the collection of samples comprises various samples located one on top of another, further comprising:
    an electric motor for causing a relative movement according to the detection direction between the sheet of light and the sample while maintaining a constant angle of acquisition;
    a camera for obtaining, for said angle of acquisition, a single 2D projection image formed by a representative parameter for each pixel;
    an electric motor for modifying the angle of acquisition by means of a relative rotation between the sheet of light and the sample, combined with a relative vertical translation between the sheet of light and the sample; and
    a reconstruction algorithm for generating a 3D image of each of the samples from the set of 2D projection images that are produced,
    wherein the reconstruction algorithm comprises applying an inverse Radon transform to the set of projection images that are produced to generate the 3D image; and
    wherein the electric motor, for causing a relative movement according to the detection direction between the sheet of light and the sample, is configured to perform a continuous movement.

8. The microscope according to claim 7, wherein the electric motor causes the relative vertical translation between the sheet of light and the sample.

9. The method of claim 1, wherein the image acquisition device is a CMOS camera.

10. The method of claim 1, wherein the lighting device is a laser beam.

* * * * *